United States Patent [19]

Bulte

[11] Patent Number: 5,076,640

[45] Date of Patent: Dec. 31, 1991

[54] SEAT WITH A REVERSIBLE BACK REST

[75] Inventor: Jacques Bulte, Gagny, France

[73] Assignee: Establissements Compin, Paris, France

[21] Appl. No.: 547,628

[22] Filed: Jul. 2, 1990

[30] Foreign Application Priority Data

Jul. 5, 1989 [FR] France ................. 89 09046

[51] Int. Cl.$^5$ .............................................. B60N 1/02
[52] U.S. Cl. ......................................... 297/101; 297/94
[58] Field of Search .......................... 297/101, 103, 94

[56] References Cited

U.S. PATENT DOCUMENTS

| 615,227 | 11/1898 | Pickles | 297/101 |
| 923,197 | 6/1909 | Murchison | 297/94 |
| 1,169,727 | 1/1916 | Lang | 297/101 |
| 1,214,124 | 1/1917 | Bennett | 297/101 |
| 1,301,019 | 4/1919 | Walker | 297/101 |
| 1,360,966 | 11/1920 | Marsh | 297/101 X |
| 3,265,435 | 8/1966 | Bilancia | 297/101 |
| 4,407,542 | 10/1983 | Kehl et al. | 297/94 X |

Primary Examiner—Peter A. Aschenbrenner
Attorney, Agent, or Firm—Scully, Scott Murphy & Presser

[57] ABSTRACT

A seat with a reversible back rest having on each side of the cushion (14), two coupling rods (20, 22) articulated on the lower part of the back rest (18) and on a vertical support plate (16) at two points (24, 26) situated on a same horizontal line, with the result that the back rest may pivot between two service positions symmetrical relative to the mid point (x-y) of the segment formed by said two points. It furthermore comprises a back rest-locking connecting rod (32) mounted on each side of the seat, a first end (34) of each connecting rod being articulated on the lower part of the back rest and a second end (36) being accommodated in a vertical slot (38) formed on the support plate (16) in said mid point (x-y) where it may slide, retractable stop means (40) intended to keep said second end of the connecting rod in said position, and control means (46, 62) which may be actuated by the operator and are intended to retract the stop means so as to enable said second end of the connecting rod to slide freely in the slot (38).

9 Claims, 1 Drawing Sheet

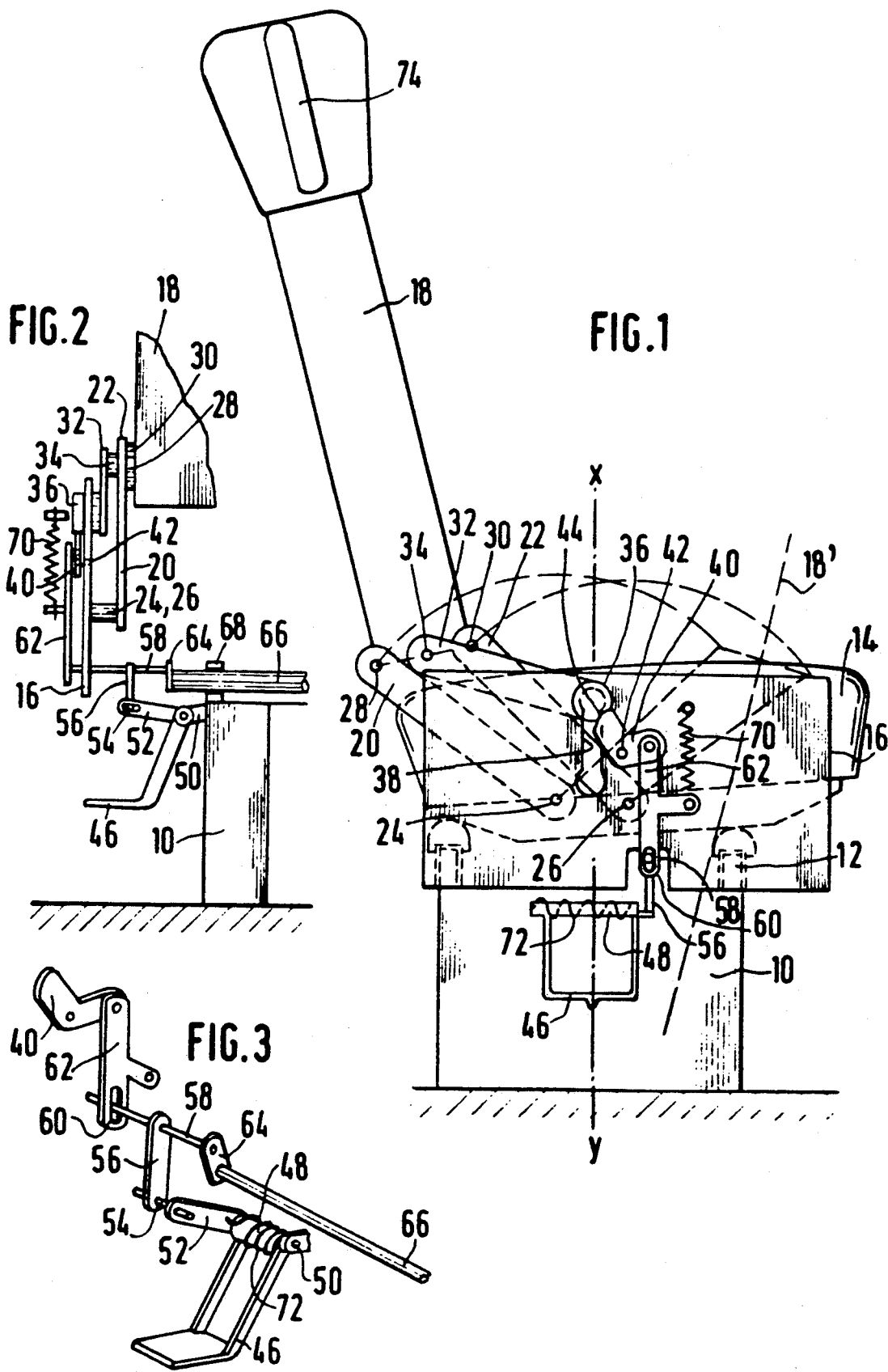

SEAT WITH A REVERSIBLE BACK REST

The present invention relates to a seat, in particular for a railroad car, which is provided with a back rest capable of being tilted between two symmetrical extreme use positions so as to enable the user to at all times be sitting in the direction in which the train is traveling.

A seat of this type is already known in which the lower part of the back rest is connected by two pairs of coupling rods to two vertical support plates, respectively, arranged on either side of the seat. In a known embodiment, the coupling rods are free of any locking and the back rest is held in each of said positions only under the force of gravity resulting from the slight backward inclination of the back rest relative to the direction of travel. In order to move the back rest from one position to the other, it need only be tilted, for example by pulling on a handle fixed to its upper part.

It is known from U.S. Pat. Nos. 4,407,542, 4,081,051 and PCT/U.S. Pat. No. 80/00181 to lock the back rest in each of its positions, for example by means of two bolts fixed on the coupling rods, respectively, and two keepers fixed on the support plates. When at least one bolt penetrates a keeper, the back rest is locked in position.

However, in this embodiment the bolts are situated relatively close to the articulation of the coupling rods on the support plate with the result that relatively substantial operating play is manifested in the region of the articulations of the coupling rods on the back rest, which is translated by the back rest being unstable in its use positions.

Furthermore, since the two locking systems which are situated on either side of the seat are independent, there is a possibility that only one of them engages when the back rest reaches one of its use positions, with the result that all that part of the back rest situated opposite is free and that the back rest consequently buckles and torsional forces appear tending to deform the articulations of the coupling rods on the back rest and on the support plates.

The object of the present invention is to overcome these disadvantages and to this end relates to a seat with a reversible back rest, of the type comprising, on each side of the cushion, two coupling rods, two ends of which are articulated on the lower part of the back rest and the other two ends are articulated on a vertical support plate at two points situated on a same horizontal line, with the result that the back rest may pivot between two service positions symmetrical relative to the mid plane of the segment formed by said two points, said seat being characterized in that it furthermore comprises:

a back rest-locking connecting rod mounted on each side of the seat, a first end of each connecting rod being articulated on the lower part of the back rest and a second end being accommodated in a vertical slot formed on the support plate in said mid plane where it may slide, said connecting rod being arranged such that when the back rest is situated in one of its two service positions, its second end is at the upper end of the slot, retractable stop means intended to keep said second end of the connecting rod in said position, and control means which may be actuated by the operator and are intended to retract the stop means so as to enable said second end of the connecting rod to slide freely in the slot and thus to permit the tilting of the back rest toward its other position.

In a particular embodiment, the stop means consist of an elbow lever articulated at its elbow on the support plate and returned under normal conditions by spring means towards a position in which one of its arms at least partially covers the slot, thus locking the second end of the connecting rod in the upper position in the slot.

Said arm of the elbow lever advantageously has an eccentric cam profile which, when it interacts with the connecting rod, eliminates any of the latter's play both in the region of the slot and of its articulation on the back rest.

Due to the elimination of this play, the back rest is secured in a positive and particularly stable manner in each of its positions, in contradistinction to the prior art described above where the locking was effected on the coupling rods themselves.

Calculations and tests carried out by the Applicant have shown that the connecting rod according to the invention must be given an optimum inclination relative to the horizontal for it to ensure satisfactory locking of the back rest and for its end to slide at the same time freely in the slot when it is freed. Indeed, in order to obtain maximum locking, the connecting rod should be virtually perpendicular to the axis of the slot since by exerting a torque on the back rest the connecting rod would then come into abutment with the vertical flan[sic]of the slot. This position is not, however, acceptable, given that after the elbow lever has been suppressed, it would be difficult for the end of the connecting rod to descend in the slot since the torque exerted on the back rest would be transmitted to the connecting rod in the form of a force substantially perpendicular to the axis of the slot and having virtually no vertical component.

This is the reason why, according to the invention, the compromise solution has been chosen which consists in giving the connecting rod a slight inclination from the line perpendicular to the axis of the slot such that the force which is exerted in the axis of the connecting rod has a substantial component perpendicular to the slot and a sufficient vertical component to lower the end of the connecting rod in the slot when the connecting rod is unlocked.

According to an embodiment of the invention, the control means comprise a pedal which may be actuated by foot and is connected by transmission means to the second arm of the elbow lever.

When the pedal is depressed, the elbow lever is pivoted in a direction for which its arm with a camshaped end frees the slot.

As mentioned above, two identical, locking systems may be mounted on either side of the seat. In this case, it is advantageous to provide a link enabling the two elbow levers to be actuated by the same pedal.

The invention will now be explained in detail by describing a preferred embodiment and with reference to the attached drawings, in which:

FIG. 1 is a side view of a seat provided with a back rest-locked device according to the invention;

FIG. 2 is a partial back view of FIG. 1; and

FIG. 3 is a perspective view of the control means for unlocking the locking device.

The seat according to the invention comprises a mounting 10 made integral with the floor of the car by any known means and on which a metal-section framework 12 is mounted serving to support a padded cushion 14. Two vertical and parallel support plates, only one of which 16 can be seen in the FIGS. 1 and 2, are fixed to the mounting on either side of the cushion.

The seat also has a back rest 18 which is capable of being tilted between a first position shown in solid lines in FIG. 1 and a second position which, for the sake of the clarity of the drawing, has been represented only by the dashed line 18' but which will be described in more detail below. The back rest may thus be positioned such that the passenger is at all times in the direction in which the train is traveling.

To this end, the back rest is articulated with the support plates 16 by means of two pairs of coupling rods, one pair of which 20, 22 can be seen in FIGS. 1 and 2, the second pair being situated on the other side of the cushion. To be more precise, said coupling rods are articulated on the one hand on the support plate 16 via two pins 24, 26 situated on a same horizontal line and on the other hand on the lower edge of the back rest via two pins 28, 30 arranged such that the back rest is inclined slightly backward relative to the direction in which the train is traveling, in each [lacuna] its service positions.

Means are furthermore provided enabling the back rest to be locked in one of its positions 18, 18' so as to prevent it tilting accidentally under rapid deceleration or an impact.

These locking means consist of two connecting rods, only one of which 32 is shown in FIGS. 1 and 2. This connecting rod is articulated on the lower edge of the back rest via a pin 34 situated at the center of the segment which joins the pins 28, 30. The other end of the connecting rod is provided with a shouldered boss 36 which slides in a vertical slot 38 pierced in the support plate 16 at the intersection of the latter with the mid plane of the segment joining the pins 24, 26 of the coupling rods.

The length of the slot and the relative positions of its ends relative to the pins 24, 26 are selected such that when the back rest is in one of its extreme positions 18, 18', the shouldered boss 36 is situated at the upper end of the slot.

The shouldered boss is retained in this position by one of the arms of an elbow lever 40, which elbow lever is mounted pivotably about a pin 42 carried by the support plate and which traverses the elbow lever in the vicinity of its elbow. The end 44 of said arm which is in contact with the shouldered boss has an eccentric cam profile capable of exerting on the connecting rod a powerful clamping force which eliminates any functional play in the region of the articulations 34 and 36.

The elbow lever may be driven clockwise, freeing the threaded boss and enabling it to descend in the slot, by way of unlocking-control means which will now be described with reference to FIGS. 1 to 3.

Said means comprise a pedal 46 which may be actuated by foot and which is mounted pivotably about a horizontal pin 48 carried by an element 50 connected to the mounting 10. The pedal is integral with a bent-back piece 52 which is traversed at its end by a horizontal pin 54. On this pin is articulated the lower end of a vertical rod 56 which carries at its upper end a horizontal pin 58. One end of the pin 58 moves up and down in a slot 60 pierced in a link 62, the upper end of which is articulated on the second arm of the elbow lever 42. The other end of the pin 58 is integral with an arm 64 which is keyed on a linking tube 66. The latter is mounted rotatably about its axis in bearings 68. The linking rod is connected to a linkage identical to that which has just been described and which is situated on the other side of the seat.

The link 62 is returned towards an upper position by a spring 70. Similarly, the pedal is kept firmly in the raised position by a torsion spring 72 which is wound about the pin 48.

The positioning of the device for locking the back rest will now be explained: the back rest is assumed to be locked initially in the position shown in FIG. 1, the position it occupies when the train is moving towards the right in the figure. When the train is to move in the opposite direction, the attendant tilts the back rest 18 towards the position 18'. In order to do this, he presses on the pedal 46 which, pivoting about the axis 48 counter to the force of the spring 72, drives the pin 54 downward and therefore lowers (in FIGS. 2 and 3) the rod 56. In this movement, the latter drives the linking tube 66 in rotation about its axis. The two links 62 which are situated on both sides of the seat are consequently driven downward counter to the force of their respective spring 70, which causes the elbow levers 40 to pivot in a clockwise direction in FIG. 1. The arms with a cam profile 44 are withdrawn from the slots 38 with the result that the connecting rods 32 are then free.

The attendant then need only pull the handle 74 in order to tilt the back rest 18. The shouldered bosses 36 begin to descend in their respective slot. The attendant may then release the pedal since the bosses 36 maintain the elbow levers 40 in a distanced position. During the tilting, the ends 28, 30 of the coupling rods 20, 22 describe arcs of a circle shown in dashed lines in FIG. 1. After the back rest has passed the line of symmetry, the shouldered bosses rise in their slot and once they have reached the upper end of their travel in their slots, the elbow levers 40 are returned by springs 70 towards their position where they lock the shouldered bosses. The eccentric cams 44 ensure a powerful locking of the connecting rods, eliminating the functional play at the articulation 34. The back rest is then fixed solidly in position.

I claim:

1. Seat with a reversible back rest, of the type comprising, on each side of the cushion, two coupling rods (20, 22), two ends (28, 30) of which are articulated on the lower part of the back rest (18) and the other two ends are articulated on a vertical support plate (16) at two points (24, 26) situated on a same horizontal line with the result that the back rest may pivot between two service positions symmetrical relative to the mid point (x-y) of the segment formed by said two points, said seat being characterized in that it furthermore comprises:

a back rest-locking connecting rod (32) mounted on each side of the seat, a first end (34) of each connecting rod being articulated on the lower part of the back rest and a second end (36) being accommodated in a vertical slot (38) formed on the support plate (16) in said mid point (x-y) where it may slide, said connecting rod being arranged such that when the back rest is situated in one of its two service positions, its second end (36) is at the upper end of the slot, a retractable stop means (40) in contact with said second end of said connecting rod intended to keep said second end of the connecting rod in either of said two positions, and a control means (46, 62) mounted on at least one side of said seat inn mechanical communication with said stop means which may be actuated by the operator and are intended to retract the stop mans so as to enable said second end of the connecting rod to slide freely in the slot (38) and thus to permit the tilting of the back rest toward its other position.

2. Seat with a reversible back rest according to claim 1, characterized in that the stop means consist of an elbow lever (40) articulated at its elbow (42) on the support plate (16) and which is under normal conditions returned by spring means (70) towards a position in which one of its two arms at least partially covers the slot (38), thus locking the second end (36) of the connecting rod in the upper position in the slot.

3. Seat with a reversible back rest according to claim 1, characterized in that a first of two said arms of the elbow lever has an eccentric cam profile (44) which, when it interacts with the connecting rod (32), eliminates any play at the ends of the latter both in the region of the slot and of its articulation (34) on the back rest.

4. Seat with a reversible back rest according to claim 1, characterized in that each connecting rod (32) has, when it is in the locked position, an inclination relative to the slot (38) such that a force exerted in the axis of the connecting rod has a large horizontal component and a small vertical component.

5. Seat with a reversible back rest according to claim 1, characterized in that said second end of the connecting rod carries a shouldered boss (36) which is received in the slot (38).

6. Seat with a reversible back rest according to claim 1, characterized in that the control means comprise a pedal (46) which may be actuated by foot and is connected by transmission means (52, 56, 62) to a second of said two arms of the elbow lever (40) such that when the pedal is depressed, the elbow lever is pivoted in a direction for which its first arm with a cam-shaped end frees the slot (38).

7. Seat with a reversible back rest according to claim 6, characterized in that said transmission means comprises a vertical link (62) whose upper end is articulated on the second arm of the elbow lever (40) opposite the one which covers the slot (38), said link being mounted so as to be able to slide vertically and being returned under normal conditions to the upper position by a return spring (70), in which position it stresses the elbow lever into a position blocking the slot (38), it being possible for said link to be driven downward counter to the force of said spring, when the pedal is pressed, by a linkage (52, 54, 56) which connects the latter to the lower end of the link.

8. Seat with a reversible back rest according to one of the preceding claims, characterized in that it comprises two identical back rest-locking systems mounted on either side of the seat and connected by a linking means (66) such that the two elbow levers (40) situated on both sides of the seat may be actuated by the same pedal (46).

9. A seat with a reversible back rest according to claim 8, characterized in that said linking means consists of a turn (66) mounted pivotably about its axis in bearings (68) which bearings are connected to at least one mounting (10) which supports said seat, and at the ends of which are fixed, respectively, two radial arms (64), the movement of the pedal being transmitted to both said arms (64) and to the links (62) by a linking coupling rod (56).

* * * * *

UNITED STATES PATENT AND TRADEMARK OFFICE
CERTIFICATE OF CORRECTION

PATENT NO. : 5,076,640

DATED : December 31, 1991

INVENTOR(S) : Jacques Bulte

It is certified that error appears in the above-identified patent and that said Letters Patent is hereby corrected as shown below:

Column 2, line 52: "camshaped" should read --cam-shaped--

Column 2, line 62: "rest-locked" should read --rest-locking--

Column 4, line 45, Claim 1: "cushion," should read --cushion (14),--

Column 5, line 2, Claim 1: "inn" should read --in--

Column 5, line 4, Claim 1: "mans" should read --means--

Signed and Sealed this

First Day of June, 1993

Attest:

MICHAEL K. KIRK

*Attesting Officer*    Acting Commissioner of Patents and Trademarks